Figure 1:
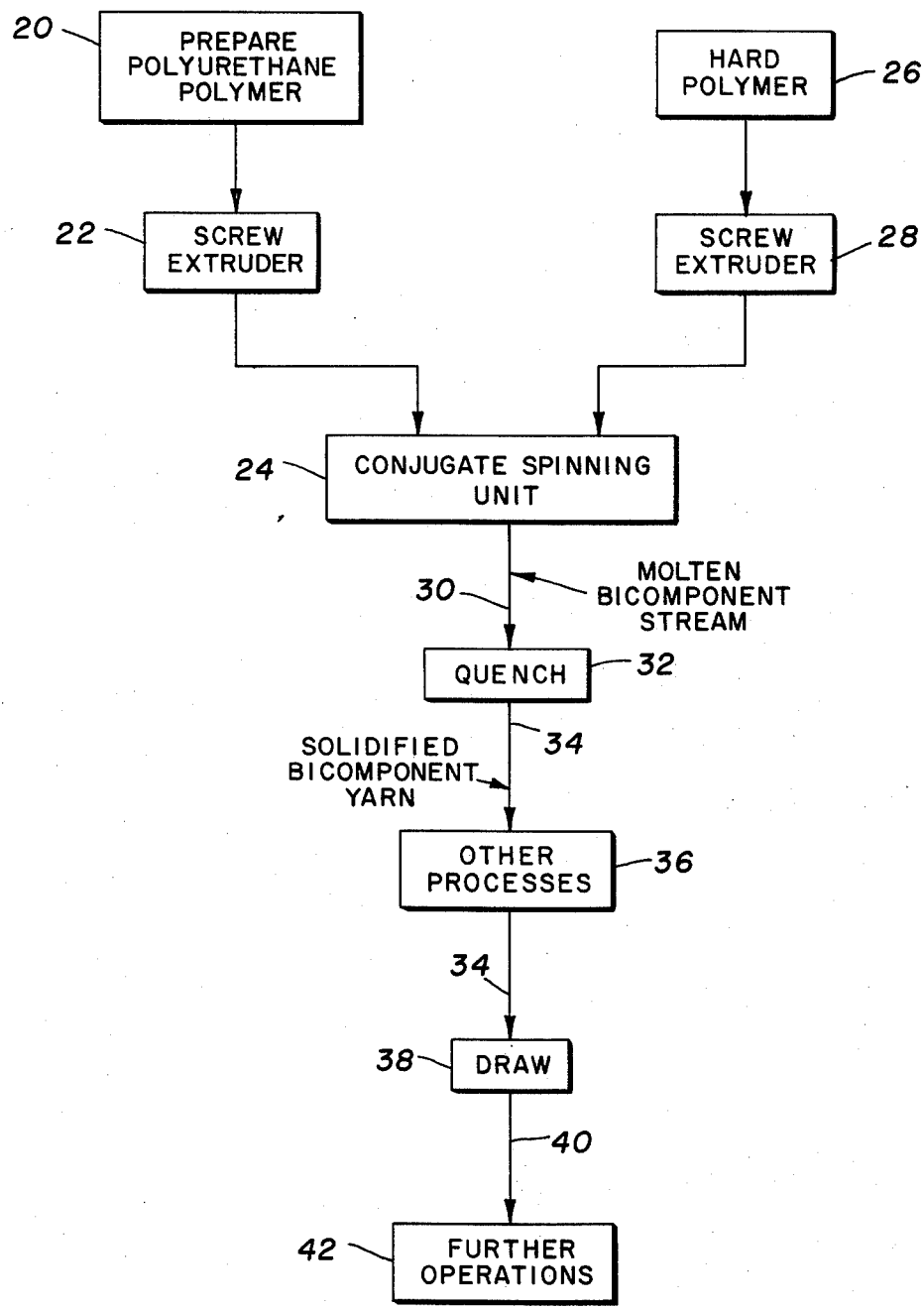

United States Patent [19]

Martin

[11] 3,987,141
[45] Oct. 19, 1976

[54] PROCESS FOR SPINNING POLYURETHANE-HARD POLYMER CONJUGATE YARN

[75] Inventor: Donald H. Martin, Gulf Breeze, Fla.

[73] Assignee: Monsanto Company, St. Louis, Mo.

[22] Filed: June 24, 1974

[21] Appl. No.: 482,535

Related U.S. Application Data

[63] Continuation of Ser. No. 353,028, April 20, 1973, abandoned.

[52] U.S. Cl. .......................... 264/171; 260/77.5 SP; 264/210 F; 428/373
[51] Int. Cl.² ...................... B29F 3/10; D02G 3/02
[58] Field of Search ........................ 264/171, 210 F; 260/77.5 SP; 428/373

[56] References Cited

UNITED STATES PATENTS

| 3,174,949 | 3/1965 | Harper | 260/75 SP |
| 3,233,025 | 2/1966 | Frye et al. | 264/176 Z |
| 3,357,954 | 12/1967 | Kirkaldy | 260/75 SP |
| 3,642,964 | 2/1972 | Rausch et al. | 264/176 Z |
| 3,668,185 | 6/1972 | Boutsicaris | 264/176 Z |
| 3,761,348 | 9/1973 | Chamberlin | 264/171 |
| 3,839,284 | 10/1974 | Mohajer | 260/77.5 SP |

FOREIGN PATENTS OR APPLICATIONS

| 43-6105 | 3/1968 | Japan | 264/176 Z |

*Primary Examiner*—Jay H. Woo
*Attorney, Agent, or Firm*—Kelly O. Corley

[57] ABSTRACT

Drawing performance of a conjugated elastomeric polyurethane-hard polymer yarn is improved by critical stoichiometry in preparation of the polyurethane polymer, which is made by reacting together a high molecular weight diol, a low molecular weight diol, and a diisocyanate so that the resulting polyurethane contains between 1 and 45 (preferably between 1 and 27) microequivalents of free isocyanate groups per gram of polymer at the time of melt spinning.

4 Claims, 1 Drawing Figure

PROCESS FOR SPINNING POLYURETHANE-HARD POLYMER CONJUGATE YARN

CROSS-REFERENCE TO RELATED APPLICATION

This application is a continuation in part of our co-pending application Ser. No. 353,028 which was filed on Apr. 20, 1973 and now abandoned.

The invention relates to improving the drawing performance of a permanently conjugated yarn formed by melt spinning together a segmented elastomeric polyurethane with a hard (non-elastomeric) polymer. More particularly, the invention relates to certain critical parameters in the polyurethane, which lead to less breaks and wraps when the conjugate yarn is subsequently drawn.

There have been recent suggestions in the art relating to conjugating an elastomeric segmented polyurethane with a non-elastomeric or hard fiber, the resulting melt-spun conjugate yarn being drawn before it is suitable for its ultimate and intended utility. It has heretobefore not been known how to reproduceably make such a yarn which could be drawn at commercially practical speeds with an acceptably low level of yarn breaks and wraps per pound of yarn.

This and other difficulties with the prior art practice are avoided, according to one aspect of the present invention, by providing a critical narrow range of stoichiometry such that the finished polyurethane polymer contains between 1 and 45, and preferably between 1 and 27, microequivalents of unreacted isocyanate per gram of polymer, as more fully set forth below.

A primary object of the invention is to provide an improved process involving a polyurethane polymer which is more amenable to being melt spun-conjugately with a hard polymer and then being drawn at commercially practical speeds.

A further object of the invention is to provide a process for making a polyurethane polymer of the above character.

A further object is to provide a method for determining when a given batch of polyurethane polymer should be spun.

Other objects will in part appear hereinafter and will in part be obvious from the following detailed description taken in connection with the accompanying drawing, wherein the FIGURE is a block diagram of the process for making the desired drawn conjugate yarn.

As shown generally in the FIGURE, the desired yarn is prepared by a sequence of operations, most of which are known per se. A particular polyurethane polymer according to the invention is indicated as prepared in block 20, as more fully disclosed below. The finished polyurethane polymer is melted, as by screw extruder 22, and fed to conjugate spinning unit 24. A hard polymer is provided in block 26, melted as by screw extruder 28, and also fed to conjugate spinning unit 24. The two molten polymers are brought together in spinning unit 24 and spun as a molten bicomponent stream 30. Stream 30 is quenched (cooled until solidified) in block 32 as by a cool air stream to form a solidified spun conjugate yarn 34. Spun conjugate yarn 34 is then subjected to optional other processes in block 36, these optional other processes including such conventional steps as applying to the yarn a spin finish composition, winding the spun yarn onto an initial temporary package, etc.

Spun yarn 34, after being subjected to such processes in block 36 as are desirable, is fed to draw zone 38 wherein yarn 34 is drawn by a draw ratio of at least 2.0 to 1. Ordinarily the draw ratio will be between about 3 and 5 to 1, depending largely on the properties of the hard polymer.

The resulting drawn yarn 40 is fed to further operations represented by block 42, wherein it is wound, twisted and wound, heated under controlled tension, or the like. The processes as thus far described, except for the preparation and composition of the polyurethane as set forth in block 20, are known in the in the art. The novelty herein lies in the preparation or selection of the polyurethane according to certain critical parameters as set forth below.

The polyurethanes according to the invention may be regarded as block copolymers, being formed by reacting together (1) a high molecular weight hydroxy terminated polymeric diol having a molecular weight between 800 and 3000 (preferably between 1800 and 2200), (2) a low molecular weight polyol, and (3) a diisocyanate. Minor amounts of additives can also be present if desired. Typical additives are stabilizers against light, heat or oxidation, such as hindered phenols; materials for reducing the tackiness of freshly extruded polyurethane polymer, typified by alkylene bis-amides; pigments or fillers, such as titanium dioxide; or catalysts.

The high molecular weight diol may be a polyether or a polyester. Suitable polyethers include poly(oxyethylene) glycol; poly(oxypropylene) glycol; poly(1,4-oxybutylene) glycol; poly (oxypropylene)-poly(oxyethylene)glycol; etc. Suitable polyesters are obtained by the condensation reaction between a dicarboxylic acid and a glycol, or from a polymerizable lactone. Preferred polyesters are derived from adipic, glutaric or sebacic acid, one or more of which is reacted with a moderate excess of such glycols as ethylene glycol; 1,4-butylene glycol; propylene glycol; diethylene glycol; dipropylene glycol; 2,3-butanediol; 1,3-butanediol; 2,5-hexanediol; 1,3-dihydroxy-2,4,4-trimethylpentane; or mixtures of such diols. Useful polyesters may also be made by the reaction of a polymerizable lactone such as caprolactone with an initiator such as a glycol.

Many different common glycols can be used as the low molecular weight polyol or chain extender. Examples are 1,4butanediol; ethylene glycol; propylene glycol; and 1,4-B-hydroxyethoxy benzene. The combination of low molecular weight polyol and diisocyanate, as to type and amount, preferably is chosen so as to provide a DTA melting point of the polyurethane polymer in the range of 200°–235° C. The polyol should be primarily composed of one or more diols having a molecular weight below 500, although as explained below, it may be desirable to include as part of the polyol a smaller molar amount of a multifunctional compound containing three or more hydroxyl groups per molecule. In such a case, the latter compound can have a molecular weight up to 1,500. Amounts up to 0.3 mols of the multifunctional compound per mol of the high molecular weight diol can be used, although ordinarily only about 1/10 or less of this amount need be added for viscosity control. Typical multifunctional compounds are glycerine, trimethylol propane, hexantriol and the like.

Suitable diisocyanates may be selected from a variety of classes, including alicyclic, aromatic, aryl-aliphatic, and aliphatic diisocyanates. Particularly useful diisocyanates are 2,4-tolylene diisocyanate; 4,4'-dicyclohexylmethane diisocyanate; 4,4'-diphenylmethane diisocyanate; xylylene diisocyanate (either meta- or para-); 1,4-cyclohexane diisocyanate; 1,6-hexamethylene diisocyanate; and 1,4-tetramethylene diisocyanate.

It has been discovered that improved drawing performance of the conjugate yarn is achieved if the polyurethane polymer has between 1 and 45 microequivalents of free diisocyanate per gram of polymer, as measured just prior to spinning. Preferably such a polyurethane polymer is made by reacting together, for each mol of the high molecular weight diol, between 2.2 and 8.5 mols of the low molecular weight polyol, and a small excess of diisocyanate sufficient to provide between 1 and 45 microequivalents of free isocyanate in the resulting substantially completely reacted polyurethane polymer measured just prior to spinning. Preferably there are between 3.0 and 6.5 mols of the polyol or chain extender for each mol of the high molecular weight diol, since polymers with less than 3.0 mols polyol tend to be excessively tacky, while those with more than 6.5 mols tend to have poorer elastomeric properties. These reagents are preferably combined by first heating a premixture of the hydroxyl compounds and then blending the diisocyanate into the premixture. Temperatures of the reagents at blending should be above the melt point of all the reagents and below about 180° C. Temperatures of 90°–110° C. are preferred. After mixing the reagents, the resulting molten mixture exotherms and is maintained within the temperature range between 100° C. and 180° C. (preferably between 120°–170° C.) until the molten mixture solidifies, at which point polymerization is not yet complete. Polymerization is continued to substantial completion in the solid state at the temperature or temperatures between 0° C. and 180° C., (preferably between 15° C. and 50° C.). When the free isocyanate content reaches a level between 1 and 45 (preferably between 1 and 30 or less) microequivalents of isocyanate per gram of the finished polyurethane polymer, the polymer is ready to be melt spun.

EXAMPLE

One mol of poly(butylene adipate), acid number 1.5, hydroxyl number 55, is mixed at a temperature of 100° C. with 5.34 mols of 1,4-butanediol. The resulting premixture is thoroughly blended with 6.4 mols of 4,4'-diphenylmethane diisocyanate by rapid stirring for ten seconds. The blended reaction mixture is then cast on a heated tray in an oven heated to 130° C. The reaction mixture solidifies to a low molecular weight polymer in 2 or 3 minutes. The oven temperature is then increased to 150° C. for 6 minutes to increase the molecular weight. The polymer is then removed from the oven, chopped into flake of the desired size and stored at room temperature in sealed dry cans under a nitrogen atmosphere.

The process of the example is repeated, adjusting the amount of diisocyanate so that the free isocyanate in the polyurethane polymer at the time of spinning several days later is as indicated in Table I. The polyurethane polymer is melt spun conjugately side-by-side with nylon 6 (a representative hard polymer) at a temperature of 226° C., air quenched, coated with a spin finish, and collected at a speed of 300 yards per minute. The nylon 6 polymer has no additives or delustrants, and has a solution viscosity of 35 ± 2 as measured by ASTM D-786-66. The resulting conjugate filament contains between 20% and 80% polyurethane, for example, 50%. The filament is conventionally drawn at a draw ratio of 4.0 to 1 at a speed of 400 yards per minute to yield a crimped side-by-side conjugate yarn with a drawn denier of about 26. Drawtwist performance is set forth in Table I.

TABLE I

| | NCO at Spinning, M eq/gm | Average Drawing Breaks/Lb. |
|---|---|---|
| a. | 60 | 0.95 |
| b. | 50 | 0.45 |
| c. | 45 | 0.32 |
| d. | 40 | 0.22 |
| e. | 30 | 0.09 |
| f. | 27 | 0.06 |

At lower free isocyanate concentrations, the breaks per pound are still further reduced somewhat. More than about 0.32 breaks per pound of yarn is not acceptable from a commercial standpoint, while a break level of less than 0.09 per pound and preferably less than 0.06 per pound is highly desirable in a commercial operation. According to one major aspect of the invention, these increasingly desirable levels of performance are achieved by using a polyurethane with between 1 and 45, and preferably no more than 30 microequivalents of free isocyanate per gram of polymer at the time of spinning. Optimum results are obtained when not more than 27 microequivalents of free isocyanate per gram of polymer are present at the time of spinning.

According to a second major aspect of the invention, it is possible to control the stoichiometry of the polyurethane reagents so that the desired free isocyanate levels are achieved within a reasonable time after the polymer is first formed. This is done by adjusting the stoichiometry so that the free isocyanate initial level (as measured 4.8 hours after the reagents are blended) is between 10 and 120 (preferably between 50 and 85) microequivalents per gram of polymer. The free isocyanate level is then decreased if necessary (as by storing the polymer at room temperature) to a final level at the time of spinning between 1 and 45 microequivalents per gram. Higher initial levels than 120 microequivalents per gram of polymer would require excessive storage time before acceptable drawing performance would be achieved, while lower initial levels than 10 microequivalents per gram of polymer would provide a polyurethane polymer having a melt viscosity too low for acceptable spinning performance. The viscosity can be increased, if necessary, by addition of small amounts of a multifunctional compound having three or more hydroxyl groups as part of the low molecular weight polyol. Ordinarily, a satisfactory viscosity increase can be achieved with the addition of very small amounts of the multifunctional compound, such as about 0.01 or 0.02 mols of triol per mol of the high molecular weight diol. Since such small molar quantities of the multifunctional compound are used, advantageously the molecular weight of this component is relatively high to minimize the effect of small errors in metering. Molecular weights up to 1500 are suitable. Such multifunctional compounds may be made by adding a small amount of triol to a conventional polyester, by polyethoxylating a triol, or by other conventional techniques. Free isocyanate initial levels within the narrower preferred range of 50 to 85 microequivalents per gram of polymer are indicative of polymers which will have the desired viscosity and which can be spun after a reasonable period of storage at room temperature to yield a conjugate yarn with good drawing performance.

According to a third major aspect of the invention, it is possible to determine when a given polyurethane polymer should be conjugately spun if a desired level of drawing performance is to be achieved. It has been discovered that the free isocyanate level $NCO_m$ in microequivalents per gram of polymer measured at any number of hours $T_m$ after the polymer reagents are blended can be related to the minimum polymer age in hours T at spinning to achieve the desired free isocyanate level by the following relationship:

$$T \geq \left( T_m \frac{NCO_m}{X} \right) 5.75$$

where X represents the desired free isocyanate level at the time of spinning. X accordingly can range from 1 to 45 according to the broader aspects of the invention, with markedly superior drawing performance being obtained when X is less than 30. Optimum results are achieved when X is less than 27.

Determination of Free Isocyanate

The free isocyanate level can be determined by various methods. The following is an exemplary technique for determination of free isocyanate, and is based on the addition of an excess of dibutylamine in dry toluene to the polymer sample, followed by titration of the excess dibutylamine with a standard hydrochloric acid solution to a bromphenol blue end point.

Dibutylamine reagent is prepared by dissolving approximately 0.65 gram dibutylamine (Fisher Scientific Co., Catalog No. 1260 or equivalent) in one liter of dry reagent grade toluene. Bromphenol blue indicator solution is prepared by dissolving 0.04% by weight of bromphenol blue indicator in dry reagent grade isopropyl alcohol. Thoroughly dried N,N'dimethylacetamide (DuPont solvent grade or equivalent) is provided.

Four grams of a representative sample of the polyurethane polymer are frozen to the temperature of liquid nitrogen at atmospheric pressure and finely pulverized, as by use of a Spex Freezer Mill, Catalog 6700 or equivalent.

About 1.0 gram of the powdered polymer weighed to the nearest 0.0001 gram, is transferred to a clean dry 125 milliliter (ml.) flask. 20 ml. of dibutylamine reagent and 15 ml. of dry N,N' dimethylacetamide are transferred by microburet to the flask. A magnetic stirrer bar, coated with an inert material such as polytetrafluoroethylene, is placed in the flask, and the flask is stoppered. The flask is then placed on a magnetic stirrer and gently stirred for 30 minutes. A blank is also prepared as described in this paragraph, except the powdered polymer is omitted.

50 ml. of anhydrous isopropyl alcohol is then added to each flask, the stopper being rinsed during this addition. 2ml. of bromphenol blue indicator solution is next added to each flask, and while vigorously stirring, the materials in both flasks are titrated to a yellow end point stable for 15 seconds using 0.01 normal hydrochloric acid. The free isocyanate content (NCO) then equals $$\frac{(A-B) \times N \times 1000}{\text{sample weight, grams}}$$

where A equals the milliliters of the hydrochloric acid required by the blank, B equals the milliliters of hydrochloric acid required by the sample, and N is the normality of the hydrochloric acid solution.

As used in the specification and claims, the term "hard polymer" means those melt-spinnable polymers which in spun fiber form can be permanently extended in length at least 100% by drawing at a temperature between room temperature and 150° C., and which in substantially fully drawn form have a maximum further elongation of 80% before breaking. By way of contrast, the elastomeric polyurethanes, even after being subjected to a stretching in excess of 100% of their original length and relaxed, can be stretched or elongated at least 100% before breaking. Typical common hard fibers include the various nylons or polyamides; (e.g. nylon 6 or nylon 66) the polyesters such as polyethylene terephthalate; and the polyolefins, such as polyethylene and polypropylene.

I claim:

1. A process for preparing a conjugate filament, comprising:
   a. preparing an elastomeric polyurethane polymer having between 1 and 30 microequivalents of free isocyanate per gram of said polyurethane polymer at the time of spinning;
   b. melt spinning said polyurethane polymer conjugately with a hard polymer to form a conjugate filament; and
   c. drawing said filament at a draw ratio of at least 2.0 to 1.

2. A process for preparing a conjugate filament comprising:
   a. preparing an elastomeric polyurethane polymer having between 1 and 27 microequivalents of free isocyanate per gram of said polyurethane polymer at the time of spinning;
   b. melt spinning said polyurethane polymer conjugately with a hard polymer to form a conjugate filament; and
   c. drawing said filament at a draw ratio of at least 2.0 to 1.

3. A process for preparing a drawn conjugate filament from a hard polymer and an elastomeric polyurethane polymer, said process comprising:
   a. measuring the free isocyanate group concentration $NCO_m$ at a time $T_m$ after said polyurethane polymer was formed;
   b. melt-spinning said polyurethane polymer conjugately with a hard polymer at a time $$T \geq T_m \left( \frac{NCO_m}{30} \right) 5.75,$$

to form a conjugate filament; and
   c. drawing said conjugate filament at a draw ratio of at least 2 to 1.

4. A process for preparing a drawn conjugate filament from a hard polymer and an elastomeric polyurethane polymer, said process comprising:
   a. measuring the free isocyanate group concentration $NCO_m$ at a time $T_m$ after said polyurethane polymer was formed;
   b. melt-spinning said polyurethane polymer conjugately with a hard polymer at a time $$T \geq T_m \left( \frac{NCO}{27} \right) 5.75,$$

to form a conjugate filament; and
   c. drawing said conjugate filament at a draw ratio of at least 2 to 1.

* * * * *